Nov. 15, 1960 P. CARVALLO 2,960,319
CONVEYOR AND TRANSPORT APPARATUS WITH STIRRING ACTION
Filed Oct. 24, 1957 2 Sheets-Sheet 1
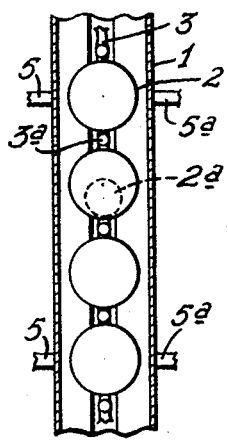
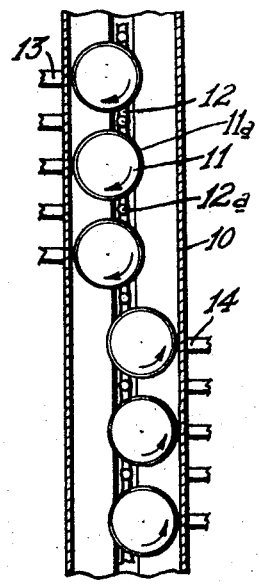
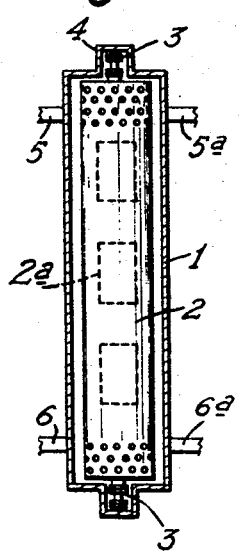
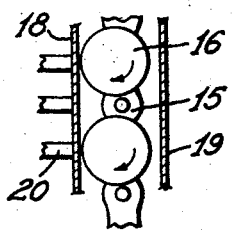
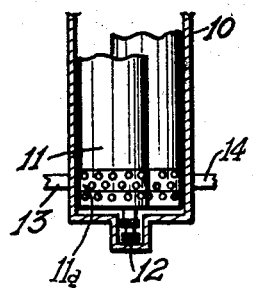

Nov. 15, 1960 P. CARVALLO 2,960,319
CONVEYOR AND TRANSPORT APPARATUS WITH STIRRING ACTION
Filed Oct. 24, 1957 2 Sheets-Sheet 2
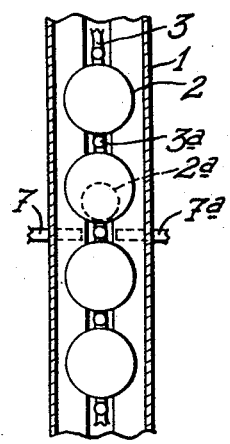
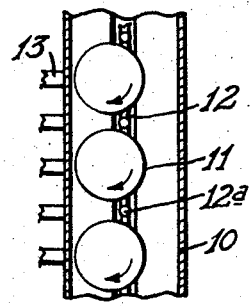
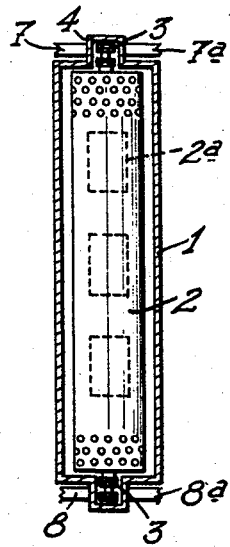
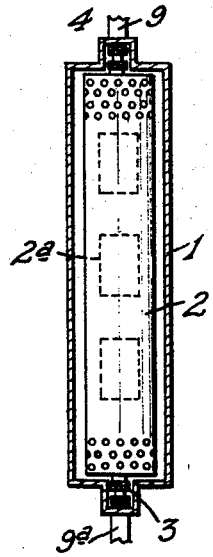

United States Patent Office 2,960,319
Patented Nov. 15, 1960

2,960,319

CONVEYOR AND TRANSPORT APPARATUS WITH STIRRING ACTION

Pierre Carvallo, 24 Villa Dupont, Paris, France

Filed Oct. 24, 1957, Ser. No. 692,141

Claims priority, application France Oct. 26, 1956

8 Claims. (Cl. 259—54)

The present invention relates to improved conveyors and stirrers, intended notably but not exclusively for use in the thermal treatment of products in sealed containers.

Apparatus are already known which are specially designed for the thermal treatment of products in sealed vessels, this treatment consisting, for example, in continuous sterilization and cooling steps wherein the vessels are transported by means of a conveyor comprising at least one chain and wherein stirring means are disposed on at least one reach of the chain so that the jolts or other movements produced by these stirring means are transmitted to the vessels subjected to the thermal treatment in order to agitate the product contained therein.

Now it is the essential object of the present invention to produce the desired stirring action as broadly set forth hereinabove by providing a treatment apparatus of this general type wherein magnetic generators are provided and so arranged that their fields, of constant or alternate direction, are applied to the conveyor chains, to the baskets containing the sealed containers or even directly to the sealed vessels subjected to the treatment, said chains, baskets or containers being made at least in part of a magnetic material.

The combination of magnetic fields generated by electromagnets or permanent magnets with the driving motion of the chains develops an agitation of the product contained within the sealed containers.

The application of unidirectional magnetic fields is adapted to produce an adherence entailing a rolling of the baskets, or of the sealed containers themselves, provided for this purpose with at least one rim in rolling engagement with guiding means disposed between the chain or chains and the magnetic generator so that these baskets and/or sealed containers may be displaced along horizontal, inclined or even vertical paths.

The combination of permanent magnets or electro-magnets with the members transporting the sealed containers may also be used in the case of so-called pre-heating apparatus wherein horizontal chain reaches support and drive cylindrical containers bearing with one of their bottoms on said chain to enable said containers made of magnetic material to roll even along a vertical wall or track.

With these simple and reliable means easily adjustable stirring movements can be obtained at a very low cost, without any maintenance and without providing costly mechanical members which would operate under high temperature and pressure while providing absolute fluid-tightness conditions.

In order to afford a clearer understanding of the present invention and of the manner in which the same may be carried out in the practice, reference will now be made to the accompanying drawings illustrating diagrammatically by way of example a few typical embodiments of the invention. In the drawings:

Figure 1 is a diagrammatic section showing part of a chain conveyor associated with electromagnets or permanent magnets according to a first embodiment.

Figure 2 is a cross section of the arrangement shown in Fig. 1.

Fig. 3 is a diagrammatic section showing part of a chain conveyor associated with electromagnets or permanent magnets, according to a second embodiment.

Fig. 4 is a cross-section of the arrangement shown in Fig. 3.

Fig. 5 is a view similar to Fig. 4 showing a third embodiment.

Fig. 6 is a view similar to Fig. 1 showing a fourth embodiment.

Figure 7 is a view similar to Fig. 1 showing a modified embodiment.

Figure 8 is a fragmentary cross-section of the apparatus shown in Fig. 7.

Figure 9 illustrates in diagrammatical section a modified embodiment of this device as applied to a pre-heater.

Figure 10 is a fragmentary plane view corresponding to Fig. 9.

Referring first to Figs. 1 and 2, the diagrammatic section illustrates a channel 1 in which tubular baskets 2 of known type which contain the sealed vessels or containers 2a are displaced as a thermal treatment is applied thereto. These baskets are driven by usual chains positioned on either side of said baskets 2 and adapted to slide on corresponding guide means 4. The baskets 2 are secured in a rigid or hinged manner on the links 3 of the chains, or they may be independent thereof, the drive being obtained in this last case by means of thrust members 3a acting as driving members. Magnetic field generators such as electromagnets comprising cores 5, 5a, 6 and 6a are disposed on either side of one wall of the channel 1, the magnetic fields developed by these electromagnets being effective on the baskets 2 made for example of magnetic material. Thus, alternate fields having the desired strength and frequency are produced which in combination with the driving motion of the chains impart oscillating movements to the baskets 2.

These electromagnets may have their cores disposed in the vicinity of the guide walls 4 of the chains as illustrated in Figs. 3 and 4 at 7, 7a, 8, 8a. Thus, the alternate magnetic fields and the driving motion of the chains producing the oscillation of the chains (the links 3 of these chains being in this case constructed of magnetic material or provided with attraction cores), the stirring action is transmitted to the baskets 2 or similar transporting members, and therefore to the transported vessels or containers.

These magnetic generators may also be arranged to act directly on the containers conveyed in the baskets, the latter being constructed of non-magnetic substances and the containers provided with attraction cores or made themselves of magnetic material.

The stirring to which the containers are thus subjected in a transverse direction with respect to the common surface on which the chains move may also be replaced by a stirring motion taking place on said surface in a transverse direction with respect to said chains. To this end, as an alternative, series of electromagnets 9, 9a registering with the links 3 of chains may be disposed as illustrated in Fig. 5. This arrangement is particularly advantageous when bottles are disposed in the baskets in a direction at right angles to said common surface.

The magnetic action contemplated for agitating the product contained within the sealed containers may also be utilized by creating unidirectional magnetic fields for producing such an agitation by a rolling movement of the containers or baskets along horizontal, inclined or vertical courses.

As illustrated in Fig. 6, the channel 10 guides baskets 11 provided with at least one circular rim 11a with the assistance of driving chains similar to the chains of the preceding embodiment, the baskets 11 being independent of the links 12 of the chains and simply driven by a thrust produced through conventional fingers 12a projecting from these chains and acting as driving members. The rim or rims 11a provided on the baskets 11 are constructed of magnetic material and attracted by magnetic generators such as electromagnets 13 disposed along a line on one side of channel 10 for forming an attraction zone on the inner surface of said channel. Due to the adherence of their rims on this attraction zone and to the driving thrust, the baskets are subjected to a torque yielding the desired rolling motion.

Magnetic-attraction zones may be disposed alternately on one and the other side of the conveyor channel 10, the baskets being rotated in one direction by the electromagnets 13 and in the opposite direction by the electromagnets 14 located on the other side as illustrated in Figs. 7 and 8.

If the baskets are not made of magnetic material, they may be provided with magnetic cores or even rims constructed of magnetic material. The direction of rotation is reversed very simply due to the change in position of the baskets with respect to the driving members, considering the independence of these baskets relative to said members when said baskets are moved in front of alternate attraction zones. If the baskets are not independent of the chains, the connecting members should preferably comprise pivoting means such as journals and trunnions, or spindles and eyelets, acting as driving members and permitting the free rotation of these baskets.

In the case of baskets or other arrangements incorporating driving sections with vessels consisting of magnetic material or provided with magnetic rims or hubs, it is also possible to cause these vessels to roll directly on said attraction zones under the guidance of said baskets.

Such stirring arrangements are applicable as shown in Figs. 9 and 10 of the drawings to preheaters wherein the links 15 of the horizontal chain supports one bottom 17 of containers consisting of cylindrical boxes, the rows of containers being guided by partitions 18, 19 parallel to the direction of travel of the chain. One of the partitions 18 may be associated with magnetic generators 20 causing the cylindrical side wall of the boxes 16 to adhere to the guide wall 18. Thus, a movement of rotation during the horizontal path is imparted to the boxes, the latter being driven for example either by catches or dogs projecting above the upper plate of the links 15 of chain, or by friction.

In this case it is possible, through magnetic adherence and tangential thrust, to impart to these containers or to the members holding them during the transport rotatory movements irrespective of the horizontal, inclined or vertical direction of the path along which they are driven, which rotary movements induce an agitation of the product contained within said containers.

The above-described electromagnets may be replaced if desired by permanent magnets fixedly or detachably mounted, with or without means for adjusting the strength and direction of the desired attraction.

The applications of the above-described arrangements to the rolling by magnetic attraction and by adherence of miscellaneous objects during a handling operation are not limited, of course, to the single specific case of the sterilization or like thermal treatment of sealed containers, vessels, boxes, cases or bottles. These applications on the contrary extend to all cases of utilization and notably to those wherein, during a transportation, it is desired to impart to the transported object a stirring action or a rolling by means of a simple magnetic thrust and attraction.

It will be readily understood that many modifications and alterations may be brought to the few forms of embodiment shown and described hereinabove without departing from the scope of the invention as set forth in the appended claims.

What I claim is:
1. A conveyor apparatus, notably for the thermal treatment of products in sealed container members, comprising, in combination, driving devices, a series of link members coupled to said driving devices for moving the latter and interconnected for defining at least one chain movable along a determinable path of travel, a series of basket members respectively disposed between successive driving devices coupled to each chain to be moved by the latter, a series of sealed container members which are housed within said basket members, the members of at least one of said three series being made at least in part of a magnetic material, and stationary magnetic field generators disposed adjacent the path of travel of each movable chain, whereby the product contained within said sealed container members is agitated under the attraction exerted by said generators on the members at least partially made of magnetic material and under the driving motion of each chain along its path of travel.

2. A conveyor apparatus, according to claim 1, further comprising guide means for each chain and wherein the magnetic field generators consist in electromagnets disposed on either side of said guide means.

3. A conveyor apparatus, according to claim 1, wherein the generators produce magnetic fields variable along the path of travel of each movable chain.

4. A conveyor apparatus, notably for the thermal treatment of products in sealed container members, comprising, in combination, driving devices, a series of link members coupled to said driving devices for moving the latter and interconnected in two rows for defining two parallel chains movable along parallel paths of travel disposed on a common surface, a series of basket members respectively disposed between successive driving devices coupled to each chain to be moved by the latter, a series of sealed container members which are housed within said basket members, a channel through which said basket members are displaced by said movable parallel chains, the members of at least one of said three series being made at least in part of a magnetic material, and stationary magnetic field generators disposed on either side of said channel in a transverse direction with respect to said common surface, whereby the product contained within said sealed container members is agitated under the attraction exerted by said generators on the members at least partially made of magnetic material and under the driving motion of said chains on said common surface.

5. A conveyor apparatus, notably for the thermal treatment of products in sealed container members, comprising, in combination, driving devices, a series of link members coupled to said driving devices for moving the latter and interconnected in two rows for defining two parallel chains movable along parallel paths of travel disposed on a common surface, a series of basket members respectively disposed between successive driving devices coupled to each chain to be moved by the latter, a series of sealed container members which are housed within said basket members, a channel through which said basket members are displaced by said movable parallel chains, the members of at least one of said three series being made at least in part of a magnetic material, and stationary magnetic field generators disposed on either side of said channel on said common surface in a transverse direction with respect to said chains, whereby the product contained within said sealed container members is agitated under the attraction exerted by said generators on the members at least partially made of magnetic material and under the driving motion of said chains on said common surface.

6. A conveyor apparatus, notably for the thermal treatment of products in sealed container members comprising in combination, driving devices, links coupled to said driving devices for moving the latter and interconnected for defining at least one chain movable along a determinable path of travel, a series of basket members respectively disposed between successive driving devices coupled to each chain to be moved by the latter, a series of rim members secured on said basket members, a series of sealed container members which are housed within said basket members, a channel through which said basket members provided with said rim members are displaced by each movable chain, the members of at least one of said three series being made at least in part of a magnetic material, and magnetic generators producing unidirectional magnetic fields and disposed in series along at least one side of said channel, whereby the product contained within said sealed container members is agitated by the rolling movement of the members at least partially made of magnetic material resulting from the attraction exerted by said generators on said last members and by the driving motion of each chain along its path of travel.

7. A conveyor apparatus, according to claim 6, wherein the series of generators are disposed alternately on opposite sides of the channel.

8. A conveyor apparatus, notably for the preheating of products in containers, comprising, in combination, a movable horizontal chain, cylindrical containers supported by said chain and made at least partially of a magnetic material, driving devices coupled to said chain for driving said containers, guiding partitions for guiding the cylindrical surface of said containers, and magnetic generators producing unidirectional magnetic fields and disposed in series along at least one of said guiding partitions, whereby the product contained in said containers is agitated by the rolling movement of said containers resulting from the attraction exerted by said generators on said containers and by the driving motion of said chain.

References Cited in the file of this patent

UNITED STATES PATENTS

| | | |
|---|---|---|
| 1,436,295 | Shumaker | Nov. 21, 1922 |
| 1,519,153 | Mitton | Dec. 16, 1924 |
| 1,581,780 | Brass | Apr. 20, 1926 |
| 2,088,304 | Mizzy | July 27, 1937 |

FOREIGN PATENTS

| | | |
|---|---|---|
| 1,111,764 | France | Nov. 2, 1955 |